United States Patent [19]

Tung

[11] 4,004,930
[45] Jan. 25, 1977

[54] FLUID COMPOSITION FOR FORMING RETROREFLECTIVE STRUCTURES

[75] Inventor: Chi Fang Tung, Mahtomedi, Minn.

[73] Assignee: Minnesota Mining and Manufacturing Company, St. Paul, Minn.

[22] Filed: July 2, 1975

[21] Appl. No.: 592,744

[52] U.S. Cl. .............................. 106/19; 106/193 R; 106/308 Q; 350/105
[51] Int. Cl.² ...................... C09D 5/00; G02B 5/12
[58] Field of Search .............. 404/14, 12; 106/193, 106/308 Q, 19; 264/140–143; 350/105, 106, 100

[56] References Cited

UNITED STATES PATENTS

| | | | |
|---|---|---|---|
| 3,171,827 | 3/1965 | de Vries | 350/105 |
| 3,175,935 | 3/1967 | Vanstrum | 350/105 |

*Primary Examiner*—Theodore Morris
*Attorney, Agent, or Firm*—Alexander, Sell, Steldt & DeLaHunt

[57] ABSTRACT

A fluid composition useful to form retroreflective structures, comprising a liquid vehicle and, dispersed in said vehicle, retroreflective platelet particles that comprise flat segments cut from a larger retroreflective sheeting.

10 Claims, 4 Drawing Figures

FLUID COMPOSITION FOR FORMING RETROREFLECTIVE STRUCTURES

BACKGROUND OF THE INVENTION

The best known commerical composition for coating a surface to make it retroreflective is described in Palmquist et al. U.S. Pat. No. 2,963,378. This composition comprises a liquid vehicle and a dispersion of transparent glass micro- spheres, each of which carries a hemispherical "cap" of vapor- coated aluminum. When the composition is coated onto a surface, a percentage of the microspheres become oriented with their uncapped surface disposed toward the outer surface of the coating. Light rays incident on the coating are approximately focused by these oriented microspheres onto their respective hemispherical caps, whereupon the light rays are reflected along substantially the same axis as they traveled to the microspheres. The result is a bright retroreflection of light.

While such coating compositions have been quite successful, they do not have a maximum retroreflectivity, since statistically only about one-third of the microspheres in a final coating are oriented to give maximum retroreflectivity. Further, such compositions are generally limited to a metallic color, caused by the hemispherical coating of aluminum. And when coating made from the compositions are wet, as from rain or condensation of moisture, their retroreflective properties are greatly reduced.

These deficiencies have been recognized during the approximately 20 years that coating compositions as described have been marketed. But despite a desire for improvement, no one insofar as known, ever provided a coating composition that countered the described deficiencies.

SUMMARY OF THE INVENTION

Briefly, a new fluid composition of the invention comprises 1. a liquid vehicle that includes a film-forming binder material; and
2. retroreflective platelet particles dispersed in said liquid vehicle comprising flat segments cut from a larger retroreflective sheeting, the shortest dimension of a face of said segments being at least about one-and-one-half times the thickness of the segments, and the segments including a monolayer of retroreflective elements optically exposed over at least one face of the segments; the index of refraction of said film-forming binder material being such that when said segments are embedded in said transparent film the retro- reflective elements will retroreflect light incident on the film.

When a coating composition of the invention is spread on a surface, the segments will tend to settle in the applied coating and, if necessary, turn so that their flat face is parallel to the substrate. Such a turning will occur, for example, when an edge of the segment strikes a substrate, because of the force of gravity or force or propulsion. Or it will occur because a coating operation such as a rolling or brushing operation introduced aligning forces. The result is that a high percentage of the particles are properly oriented to retroreflect light rays incident on a coating.

(While other flat particles, including thin, flat, specularly reflective, so-called "glitter" particles, have previously been used in coating compositions — see Coffey et al, U.S. Pat. No. 3,725,119 — no one, insofar as known, has previously suggested the use of flat retroreflective platelet particles in a coating composition, nor that such a use would answer the desire for improved orientation of retroreflective elements in such a composition. Glittr particles are distinct from retroreflective particles, and glitter coatings do not require the organization of a retroreflective coating, in which a mass of retroreflective elements must be oriented into a common position, so that those elements will cooperate to return light in the same direction.)

Preferably, segments used in the invention have a monolayer of optically exposed retroreflective elements on each of their large-area surfaces to further maximize retro- reflectivity. Such segments can be cut from webs prepared by adhering together two retroreflective sheets, with their respective monolayers of retroreflective elements facing outwardly.

Because the platelet particles are embedded in a matrix of binder material, they will retroreflect even if the coating becomes wet. Further, since the segment or platelet particle can be colored, as by coloring of a transparent cover layer on the sheeting from which the segment is cut, colored coating effects can be obtained.

DETAILED DESCRIPTION

Platelet particles or segments useful according to the invention may be cut from a number of either commerical or specially prepared retroreflective sheetings. An especially useful sheeting is flat-surfaced retroreflective sheeting as described in Palmquist et al, U.S. Pat. No. 2,407,680, which has a transparent flat cover layer that physically covers a monolayer of transparent microspheres but leaves the monolayer optically exposed. Specular reflective means, typically an aluminum vapor-coat, underlies and is in optical connection with the backs of the microspheres. The cover layer (which may be colored, as with a soluble dye or organic pigment) and microspheres have a ratio of indices of refraction that causes the microspheres to achieve a desired focusing of light rays that are incident on the front surface of the sheeting. If the microspheres focus the light rays at their back surface, the specular reflective means is typically applied directly to the microspheres. If incident light rays are focused at a point beyond the back surface of the microspheres, a transparent layer (often known as a space coat) is typically disposed between the microspheres and the specular reflective means so as to position the latter at the focal point. The desired focusing occurs even if a liquid or transparent solid material covers the cover layer, and the result is that segments cut from such sheeting will retroreflect efficiently even when covered by a liquid or embedded in a transparent film.

Segments useful according to the invention can also be cut from so-called "exposed-lens" constructions, in which a monolayer of transparent microspheres is only partially embedded in the exterior surface of a film. Such segments can be included in a coating composition and will retroreflect efficiently if the film-forming binder material in the composition and the microspheres have an appropriate ratio of indices of refraction. Space coats can also be used to achieve desired focusing. As examples, if no space coat is used and the microspheres have an index of refraction of 2.7, then the film-forming binder material should have an index of refraction of 1.38 to obtain maximum retroreflectivity. However, by proper adjustments, materials of other indices can be used; for example 2.3-index microspheres can be used in 1.5-index binder materials.

A different type of sheeting from which segments useful in the invention may be cut is described in McKenzie, U.S. Pat. No. 3,190,178. This sheeting is exposed-lens in the sense that it uses microspheres only partially embedded in a support sheet, but the microspheres are covered by a transparent cover sheet spaced above the layer of microspheres. The cover sheet is held to the support sheet by a network of bonds that form hermetically sealed pockets, and segmenting of the sheeting should maintain a high proportion of such sealed pockets.

Figure 1:
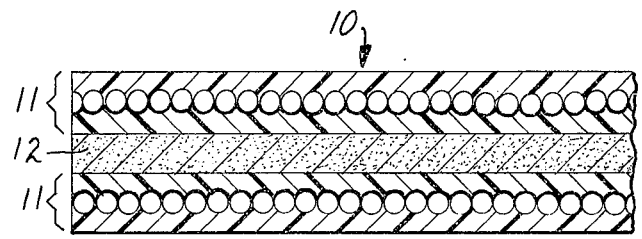
FIG. 1 is an enlarged cross-section through a platelet particle or segment useful according to the invention.

FIG. 1 shows an illustrative segment 10 prepared from two flat-surfaced retroreflective sheeting 11 adhered together back-to-back by a layer of adhesive 12. Instead of laminating two retroreflective sheets together, a single sheeting may be used, or a retroreflective sheet may be laminated to a colored or specularly reflective sheet to obtain different decorative results. A variety of adhesives can be used to adhere the sheeting together, including pressure-sensitive adhesives, solvent-activated or thermosoftening adhesives, and reactive adhesives.

Figure 2:
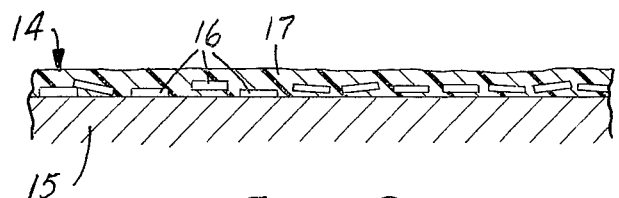
FIG. 2 is an englarged cross-section through a coating formed from an illustrative coating composition of the invention.

To increase the tendency for the segments to lie flat on one of their large-area faces in an applied coating, the shortest dimension of the segment faces should be at least about 1½ times, and preferably at least two or three times, as great as the thickness of the segments. Preferably the segments are less than 0.5 millimeter thick, and more preferably less than 0.25 millimeter thick. FIG. 2 shows an illustrative coating 14 on a substrate 15, the coating including segments 16 embedded in a transparent film 17 formed from a film-forming binder material.

Usually the segments will be square but they can also be rectangular, triangular or of unusual shapes. Provided the needed ratio of area to thickness is maintained, smaller-area segments are often desired to produce a more uniform coating. For example, square segments are often preferred that are less than about 3 millimeters, and more preferably less than 1 or 2 millimeters on a side. However, for some purposes the segments will be larger, such as 5 or 10 millimeters on a side. If the substrate to be coated is large and flat, then large segments are more useful; whereas a small and complicated surface will generally call for smaller segments. Also, coatings formed using larger segments will generally provide brighter retroreflection.

The retroreflective elements most typically comprise transparent microspheres, with some specularly reflective means underlying and in optical connection with the back surfaces of the microspheres. Aggregate of microspheres such as taught in Palmquist et al, U.S. Pat No. 3,043,196, may also be used as retroreflective elements, as can so-called "cube-corner" retroreflective elements having means, such as a coating of specularly reflective material on the cube-cornered back surface of a sheeting, to maintain retroreflectivity even when segments from the sheeting are embedded in a transparent film.

Figure 3:
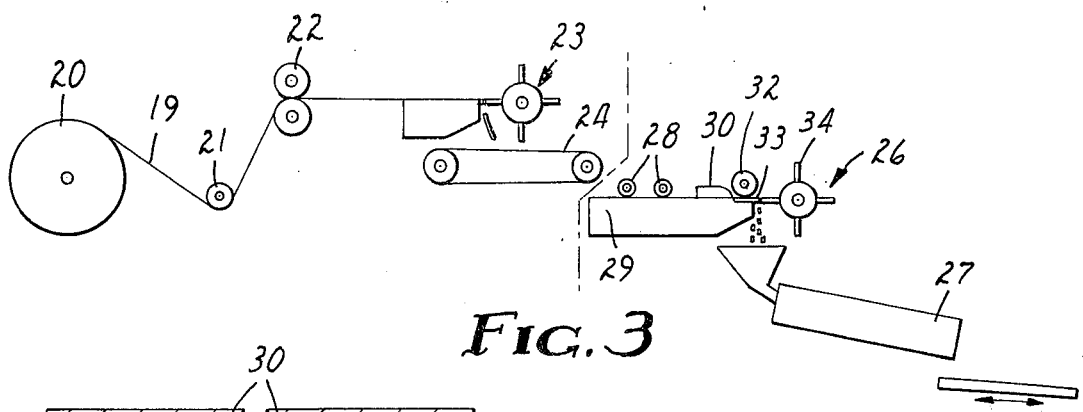
FIGS. 3 and 4 are schematic diagrams of apparatus useful in preparing segments useful according to the invention.
Figure 4A:
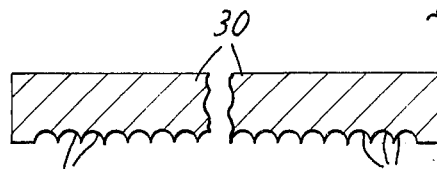
Figure 4:
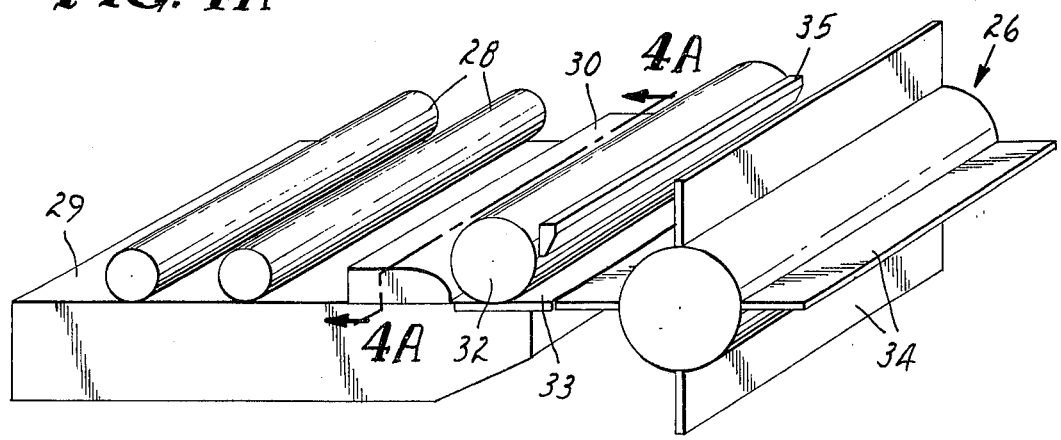

Apparatus for forming segments useful in the invention is illustrated schematically in FIGS. 3 and 4. FIG. 3 shows an overall apparatus, and FIG. 4 shows a chopper mechanism in greater detail. As shown in FIG. 3, sheeting 19 to be cut into segments may be unwound from a supply roll 20, passed around an idler roller 21, and driven by two drive rollers 22 to a chopper 23. The sheeting unwound from the supply roll 20 may be either a sheeting having a single retroreflective face or a composite sheeting in which each of its faces is retroreflective. Alternatively, two different sheetings can be unwound from supply rolls, passed through a coating station to apply adhesive to one or both of them, then pressed together by nip rolls to adhere them together, and then introduced to a chopper.

The chopper 23 produces lineal segments having a width depending on the rate of feed of the sheeting 19. (Instead of a chopper as shown, which chops a transverse length of a web, a slitting mechanism can be used, which forms longitudinal cuts in the web and thus separates the web into longitudinally extending sections.) The lineal segments then drop to a conveyer 24, and eventually pass through a second chopper 26. (Although the apparatus is shown as being straight-line, the conveyor belt or second chopper may be aligned at right angles to the first chopper so as to feed the lineal segments longitudinally through the second chopper). The second chopper 26 produces segments as shown in FIG. 1, which may be tumbled into a rotary mixer 27 together with a parting agent such as a fine silica powder or fine glass microspheres of 1.5 index refraction. The parting agent covers the adhesive at the cut edges of the segments to prevent them from sticking together. If the parting agent has an index of refraction the same as that of the binder material for the coating composition, the parting agent will not be visible in the coating. From the mixer 27 the segments cascade onto a screen that separates the segments from any excess parting agent.

FIG. 4 shows an illustrative chopper mechanism 26. Feed rolls 28 may be disposed above a table 29 to advance chopped lineal segments from the chopper 23 through a straightening guide 30. The straightening guide comprises a block, made, for example, of metal and formed with a set of parallel grooves 31 in its bottom face. The straightened lineal segments are drawn from the guide 30 with a variable speed feeding roll 32 and then over a stationary knife 33. Just beyond the stationary knife is a rotating knife assembly having several square-edged knives 34 which chop off segments from material fed along the stationary knife. A cooling gas may be applied through jets 35 to make the web more stiff and thus more readily chopped. The use of two retroreflective sheetings adhered together further enhances the stiffness of the web.

The chopping process generally leaves the segment substantially intact optically, with little separation of glass microspheres from a cover layer, for example, except to some extent along the edge of the segment. Generally the chopped product has a rather perpendicular edge.

In making a fluid composition of the invention, the platelet particles or segments are dispersed in a liquid vehicle, which typically comprises a film-forming binder material dissolved or dispersed in a volatile thinner (such as an organic solvent or water), and which forms a nontacky adherent film when applied as a thin layer onto a substrate and, exposed to an appropriate environment. Desirably the fluid composition includes a thixotropic agent to assist in maintaining the segments in dispersion. However, even if some settling occurs, the composition can be stirred to redisperse the segments. The amount of segments included in the composition varies with the effect desired. Most often, slightly fewer segments than would be needed to fully cover a coated surface are used to avoid piling of the segments on top of one another. However, more can be used to obtain brighter effects, or less can be used. The liquid vehicle and segments are compatible with one another; for example, the liquid vehicle should not dissolve or attack the cover layer or other exposed portion of a segment.

Coating compositions of the invention are especially useful for application to complex or compound surfaces such as motorcycle helmets, traffic cone sleeves, bicycle frames or fenders. Decorative effects can be obtained by using segments of different color, or segments that have a dif- ferent color on each side, whereupon a mosaic effect is obtained.

While the invention is most concerned with coating compositions, the invention also extends to compositions that are used in molding or casting application, in forming of gel-coats, etc.

Instead of incorporating segments of the invention in a fluid composition, they may be used in a drop-on application. In that case it is typical to first coat a film-forming binder material onto a surface and then drop the segments onto the coating. A cover film of binder material is then typically applied over the segments.

What is claimed is:

1. A fluid composition useful to prepare retro- reflective structures comprising:
    1. a liquid vehicle that includes a transparent film-forming binder material; and
    2. retroreflective platelet particles compatibly dispersed in said liquid vehicle comprising flat segments cut from a larger retroreflective sheeting; the shortest dimension of a face of the segments averaging at least about one-and-one-half times the thickness of the segments, and the segments including a monolayer of retroreflective elements optically exposed over at least one face of the segments; the index of refraction of said film-forming binder material being such that when said segments are embedded in said transparent film the retroreflective elements will retroreflect light incident on the film.

2. Composition of claim 1 in which said segments are cut from sheeting that comprises two retroreflective sheetings laminated back-to-back so that said segments have a monolayer of retroreflective elements optically exposed over both large- area faces of the segment.

3. Composition of claim 1 in which said monolayer of retroreflective elements comprises a monolayer of transparent microspheres covered by a flat exterior transparent cover layer.

4. Composition of claim 3 in which said transparent cover layer includes a colorant.

5. Composition of claim 1 in which the shortest dimension of a face of the segments averages at least three times the thickness of the segments.

6. Composition of claim 1 in which the shortest dimension of a face of the segments averages less than about 3 millimeters.

7. A fluid composition useful to prepare retroreflective structures comprising:
    1. a liquid vehicle that includes a transparent film-forming binder material; and
    2. retroreflective platelet particles compatibly dispersed in said liquid vehicle comprising flat segments cut from a larger retroreflective sheeting, the shortest dimension of a face of the segments averaging at least about three times the thickness of the segments but less than about 3 millimeters, and the segments including monolayer of retroreflective elements optically exposed over each face of the segment, and covered by a transparent exterior cover layer; the index of refraction of said film-formng binder material being such that when said segments are embedded in said transparent film the retroreflective elements will retroreflect light incident on the film.

8. A composition of claim 7 in which said retroreflective elements comprise transparent microspheres.

9. Retroreflective platelet particles useful, inter alia, as a reflectorizing additive for coating compositions comprising a mass of flat segments dispersible into a liquid vehicle and cut from a larger retroreflective sheeting, the shortest dimension of the faces of the segments averaging less than about one centimeter but at least about one-and-one-half times the thickness of the segments, and the segments including two back-to-back parallel monolayers of retroreflective elements, one monolayer being optically exposed over each face of the segment.

10. Retroreflective platelet particles of claim 9 in which said segments have a flat transparent exterior layer covering said monolayers of retroreflective elements.

* * * * *